United States Patent
Rampf et al.

(10) Patent No.: US 11,877,903 B2
(45) Date of Patent: Jan. 23, 2024

(54) DENTAL OBJECT WITH AN ADHESIVE REGION

(71) Applicant: Ivoclar Vivadent AG, Schaan (LI)

(72) Inventors: Markus Rampf, Seewis-Dorf (CH); Raimund Tichy, Feldkirch (AT); Alexander Grosse-Honebrink, Arbon (CH); Jonas Reinhardt, Igis (CH)

(73) Assignee: Ivoclar Vivadent AG, Schaan (LI)

(*) Notice: Subject to any disclaimer, the term of this patent is extended or adjusted under 35 U.S.C. 154(b) by 0 days.

(21) Appl. No.: 17/541,661

(22) Filed: Dec. 3, 2021

(65) Prior Publication Data
US 2022/0183806 A1 Jun. 16, 2022

(30) Foreign Application Priority Data
Dec. 16, 2020 (EP) .................... 20214629

(51) Int. Cl.
*A61C 13/24* (2006.01)
*A61C 5/30* (2017.01)
*A61C 7/14* (2006.01)

(52) U.S. Cl.
CPC .............. *A61C 13/24* (2013.01); *A61C 5/30* (2017.02); *A61C 7/14* (2013.01)

(58) Field of Classification Search
CPC ......... A61C 13/24; A61C 13/245; A61C 5/30; A61C 7/14; F16B 47/00; A47K 3/002; A47G 1/17; B60R 2011/0056; B60R 2011/0068
See application file for complete search history.

(56) References Cited

U.S. PATENT DOCUMENTS

| 1,859,893 | A | * | 5/1932 | Ritz-Woller | F16B 47/00 24/305 |
|---|---|---|---|---|---|
| 5,176,357 | A | * | 1/1993 | Hobart, II | F16B 47/00 248/205.8 |
| 6,732,385 | B1 | * | 5/2004 | Henderson | A47K 1/14 4/295 |
| 9,022,331 | B2 | * | 5/2015 | Lin | F16B 47/00 248/205.8 |
| 2006/0252010 | A1 | | 11/2006 | Sunnen | |
| 2007/0142756 | A1 | * | 6/2007 | Beiruti | A43B 17/02 601/143 |
| 2008/0021327 | A1 | * | 1/2008 | El-Bialy | A61C 8/0006 600/459 |
| 2008/0026344 | A1 | | 1/2008 | Uji | |
| 2008/0248090 | A1 | * | 10/2008 | Sunnen | A61C 19/063 424/447 |
| 2011/0200972 | A1 | * | 8/2011 | Mythen | A61B 17/244 433/217.1 |
| 2013/0196281 | A1 | * | 8/2013 | Thornton | A61C 19/063 433/8 |

(Continued)

FOREIGN PATENT DOCUMENTS

GB 116733 A 6/1918
JP H1099350 A 4/1998

*Primary Examiner* — Jacqueline T Johanas
*Assistant Examiner* — Matthew P Saunders
(74) *Attorney, Agent, or Firm* — Ann M. Knab; Thad McMurray

(57) ABSTRACT

The present invention relates to a dental object (100), having an adhering region (103) for attaching the dental object (100) to a tooth, teeth (105) or the gums, including an array (101) of suction cups (107-1, . . . , 107-n).

14 Claims, 5 Drawing Sheets

(56) References Cited

U.S. PATENT DOCUMENTS

| | | | |
|---|---|---|---|
| 2013/0320164 A1* | 12/2013 | Pyon | F16B 47/00 |
| | | | 248/206.3 |
| 2015/0170504 A1* | 6/2015 | Jooste | A61B 5/6802 |
| | | | 340/539.12 |
| 2016/0000528 A1* | 1/2016 | Thornton | A61C 13/26 |
| | | | 433/8 |
| 2017/0347956 A1* | 12/2017 | Zegarelli | A61B 5/682 |
| 2021/0282650 A1 | 9/2021 | Yoshida et al. | |
| 2021/0315460 A1 | 10/2021 | Hazama et al. | |
| 2021/0346690 A1 | 11/2021 | Demarest et al. | |
| 2021/0353180 A1 | 11/2021 | Fischer et al. | |
| 2022/0183623 A1* | 6/2022 | Tichy | A61C 19/04 |
| 2022/0183624 A1* | 6/2022 | Niedrig | A61B 5/4547 |
| 2022/0183790 A1* | 6/2022 | Senti | A61C 19/00 |
| 2022/0183805 A1* | 6/2022 | Grosse-Honebrink | |
| | | | A61C 19/04 |

* cited by examiner

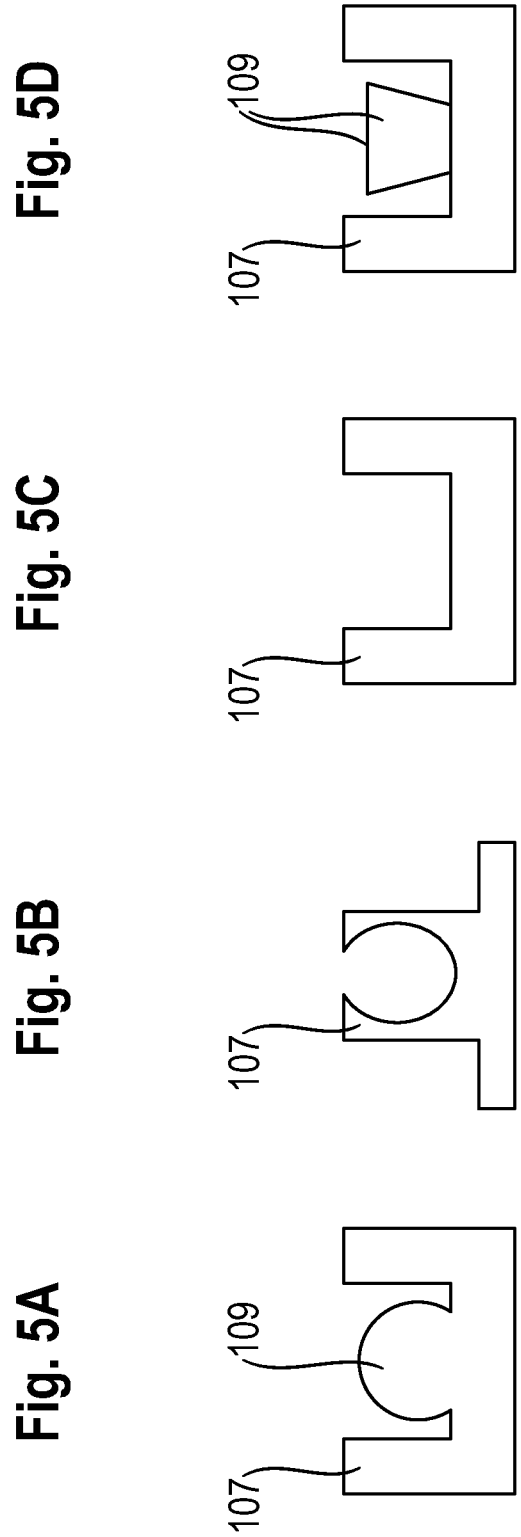

DENTAL OBJECT WITH AN ADHESIVE REGION

CROSS-REFERENCE TO RELATED APPLICATIONS

This application claims priority to European Patent Application No. 20214629.6 filed on Dec. 16, 2020, the disclosure of which is incorporated herein by reference in its entirety.

TECHNICAL FIELD

The present invention relates to a dental object having an adhering region and a method for adhering a dental object.

BACKGROUND

Today's intraoral fixation options are realized mechanically by clamps or chemically by a bonding (adhesion). Known clamping methods include, for example, clamps placed around one or more teeth, dental aligners that encompass all or part of the dental arch, or molar bands placed around one or more teeth. Adhesion is achieved by means of adhesive or cement. Attachment by adhesion is not easily removable but must be removed by a dentist and is not possible without damage to tooth enamel. This can cause problems for patients as they cannot remove a foreign body themselves for oral hygiene and this cannot be done without damage to healthy tooth material.

A further attachment option can be achieved with an adhesive cream. However, an adhesive cream only works on the gum, but not on the tooth itself. Adhesive cream can only be used for large surfaces (full denture). Furthermore, bonding cream causes only weak attachment, so it is not possible to wear a swallowable foreign body overnight. Clamping methods, on the other hand, can damage tooth structure or even displace teeth due to pressure.

US 20130196281, directed to dental hardware, and US 20060252010, directed to therapeutic dental treatment, are both incorporated by reference in their entirety.

SUMMARY

It is the technical aim of the present invention to provide a strongly adhesive and reversible attachment of a dental object in the intraoral space.

This is solved by subject-matter according to the independent claims. Technically advantageous embodiments are the subject of the dependent claims, the description, and the drawings.

According to a first aspect, the technical problem is solved by a dental object comprising an adhering region for attaching the dental object to a tooth, teeth, or gums, comprising an array of suction cups. The technical advantage of many small suction cups is that they enable high adhesion even on curved surfaces, since a tooth curvature in the micrometer range appears flat. For this purpose, it is sufficient if only part of the suction cups adheres to the tooth to ensure sufficiently good overall adhesion. In addition, the dental object ensures that the attachment can be removed, so that a patient can continue with normal oral hygiene after the dental object has been removed and no secondary diseases are triggered by the dental object. This allows plaque formation under or around the dental object to be cleaned after removal. The patient is able to remove and reinsert the dental object at any time. No damage is done to the teeth as no etching, no clamps, no brackets, no glue, and no metal are used. Teeth are not displaced by the dental object, such as with a molar band, and no bonding cream is needed. Since the dental object is only attached to the side, there is no bite elevation which is the case with braces or bite splints.

In a technically advantageous embodiment of the dental object, the suction cups have an outer diameter of 10 nm to 5 mm, preferably 10 to 50 µm. This provides, for example, the technical advantage of achieving a high adhesive effect on the tooth.

In a further technically advantageous embodiment of the dental object, the suction cups are made of polyurethane-acrylate-based polymer or polyethylene-acrylate-based polymer. This provides, for example, the technical advantage of using a material with a particularly large adhesion. Other examples include, but are not limited to, polyamides, polycarbonates, polyethylenes, polypropylenes, thermoplastic polyurethane (TPU), elastomers, pure acrylate resin, a bisphenol A epoxy acrylate resin, a novolac epoxy acrylate resin, an epoxidized oil acrylate resin, a modified epoxy acrylate resin, an aliphatic urethane acrylate resin, a polyester acrylate resin, a hyperbranched polyfunctional polyester resin, a bisphenol A epoxy resin, a cycloaliphatic epoxy resin or a combination of the foregoing.

In a further technically advantageous embodiment of the dental object, the suction cups are bell-shaped, spherical, or cylindrical. This achieves, for example, the technical advantage that the edge of the suction cups adapts better to the tooth.

In a further technically advantageous embodiment of the dental object, the suction cups have a central protrusion. This has the technical advantage, for example, that the suction cups can be detached more easily.

In a further technically advantageous embodiment of the dental object, the central protrusion is spherical or conical. This also achieves, for example, the technical advantage that the suction cups can be detached more easily.

In a further technically advantageous embodiment of the dental object, the dental object has a contact surface with a concave recess for insertion of a tooth, on which the adhering region is arranged. This also achieves, for example, the technical advantage that an anatomical adaptation of the dental object is achieved.

In a further technically advantageous embodiment of the dental object, the array comprises first suction cups with a first diameter and second suction cups with a second diameter. This also achieves, for example, the technical advantage that the adhesive effect on the tooth can be improved.

In a further technically advantageous embodiment of the dental object, the suction cups are formed by cylindrical recesses in the adhesive region. This also achieves, for example, the technical advantage that the suction cups can be manufactured in a simpler manner.

In a further technically advantageous embodiment of the dental object, the adhering region has a thickness of 10 µm to 5 mm, preferably 0.5 to 1.5 mm. This also achieves the technical advantage, for example, that a particularly good adaptation to the tooth is achieved.

In a further technically advantageous embodiment of the dental object, the suction cups are arranged in a hexagonal arrangement. This also achieves, for example, the technical advantage that a uniform adhesive effect and good surface utilization are achieved.

In a further technically advantageous embodiment of the dental object, the adhering region is attached to a contact surface by means of an adhesive layer and/or the adhering region comprises a connecting element for producing a form-fit geometry with a sensor and/or a sensor housing and/or the adhering region comprises a latching element for latching onto a sensor and/or sensor housing. The connecting element may be a nub. This also achieves, for example, the technical advantage of improving the adhesion of the adhering region to the contact surface and allowing dental objects to be attached.

In a further technically advantageous embodiment of the dental object, the adhering region comprises antibacterial particles. This also achieves, for example, the technical advantage that inflammation is prevented when the dental object is worn.

In a further technically advantageous embodiment of the dental object, the adhesive region, the dental object and/or the housing comprises one or more channels for guiding saliva to a sensor unit. This also achieves the technical advantage, for example, that properties of the saliva can be analyzed by the dental object.

In a further technically advantageous embodiment of the dental object, the dental object comprises an electronic sensor unit and/or a sensor housing. This achieves, for example, the technical advantage that a sensor for recording data can be arranged in the intraoral space.

According to a second aspect, the technical problem is solved by a method for attaching a dental object, comprising the step of pressing an adhering region of the dental object comprising an array of suction cups onto a tooth, teeth, or the gums. Thereby, the same technical advantages are achieved as by the dental object according to the first aspect.

BRIEF DESCRIPTION OF THE DRAWINGS

Examples of embodiments of the invention are shown in the drawings and are described in more detail below.

It shows:

FIG. 5A-5D cross sections through different designs of suction cups.

DETAILED DESCRIPTION

Figure 1:
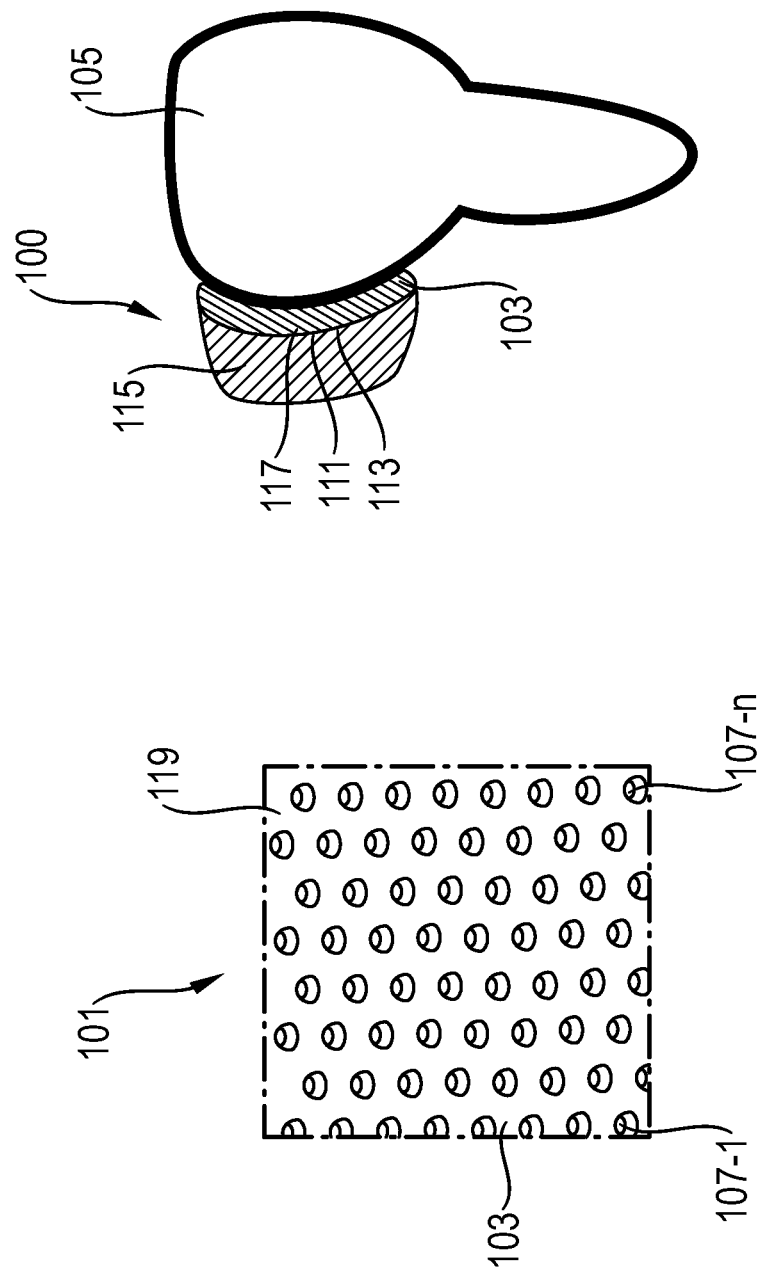
FIG. 1 a schematic representation of a dental object and an array of suction cups.

FIG. 1 shows a schematic representation of a dental object 100 with an adhering region 103 for attaching the dental object 100 to a tooth 105. The adhering region 103 of the dental object 100 comprises a matrix-shaped array 101 of suction cups 107-1, . . . , 107-$n$. The suction cups 107-1, . . . , 107-$n$ serve to fix the dental object 100 in the oral cavity. The adhering region 103 is attached to a contact surface 111 of the dental object 100.

The number of suction cups 107-1, . . . , 107-$n$-per $cm^2$ is, for example, between 30,000 and 40,000, but number per square centimeter is not limited to this amount and can range from less than or equal to 1000 to greater than or equal to 50,000 per $cm^2$. The diameter D of the suction cups 107-1, . . . , 107-$n$ is, for example, 50 μm, but is not limited to this size and can be a size and amount in order to create enough suction to maintain the dental object at the desired location in the oral cavity. However, different suction cups 107-1, . . . , 107-$n$ with different diameters may also be arranged in different areas of the adhering region 103. For example, the array 101 may have first suction cups 107-1, . . . , 107-$n$ with a first diameter and second suction cups with a second diameter. In this way, the adhesion of the adhering region 103 can be adapted to the different regions of the tooth 105. The array 101 of the suction cups 107-1, . . . , 107-$n$ is for example in hexagonal or matrix form. However, the array 101 of the suction cups 107-1, . . . , 107-$n$ can also be irregular.

The adhering region 103 may be made of polyurethane acrylate-based polymer or polyethylene acrylate-based polymer and may comprise antibacterial particles, such as by an incorporation of silver particles, copper particles, or a mixture with chlorhexidine and chloroxylenol. In addition, the plastic material may comprise antibiotics, such as penicillin, clindamycin, erythromycin, cefadroxil, metronidazole, and/or tetracyclines. In addition, pH-regulating filler materials may be used, such as calcium fluoride, calcium hydroxide, or alkaline glass fillers, such as calcium fluorosilicate glass or ion-releasing materials, such as those of F—, OH—, or Ca2+. The dental object 100 may include, but is not limited to: sensors, electronic components, antennas, batteries, or housings for various components. The housing 115 may be made of a plastic, carbon, or metal. The dental object 100 may be an object that already has a shape anatomically adapted to the tooth 105.

US 20080026344, 20210353180, 20210346690, 20210315460, and 20210282650 are directed to sensors for use in the oral cavity and are hereby incorporated by reference in their entirety.

For example, such an object may be individually created using a 3D printer and adapted to the specific shape of a patient's tooth 105, such as an individually shaped dental attachment. In general, the dental object 100 may be any object that is to be attached to the tooth 105 in the oral cavity. The suction cups 107-1, . . . , 107-$n$ may be produced using, for example, a 3D printing process, a hot stamping process, or an injection molding process.

The dental object 100 and/or the adhesion region 103 may be anatomically pre-shaped in that they comprise a concave recess 117 in which the teeth 105 lie. This allows the dental object 100 to fit more snugly against the teeth 105. A preformed passageway opening may also be provided in the adhesion region 103 for conducting fluid (saliva) from the tooth 105 to the interior of the housing 115. The fluid is directed to the sensor via the passageway opening so that a defined amount of flow arrives at the sensor. This allows the fluid from the tooth 105 inside the housing 115 to be analyzed by a sensor. In addition, it is possible to create a specific microclimate that is adapted to the measured value.

For customized dental objects 100 that are spatially and anatomically adapted to the tooth 105, the thickness of the bonding area 103 may be small and in the range of 200 μm. For prefabricated, standard dental objects 100, the thickness of the bonding area 103 is in the range of millimeters due to greater plastic deformation of the bonding area 103. For example but not limited to the following, the dimensions of the adhering region 103 in length and width may be 10 mm by 10 mm. In general, however, other dimensions may be selected if convenient.

Non-prosthetic, non-orthodontic dental objects 100 (appliance) can be reversibly fixed in the intraoral region by means of the adhering region 103. Due to the attachment with the suction cups 107-1, . . . , 107-$n$, the dental object 100 can be removed and also reinserted at any time.

Figure 2:
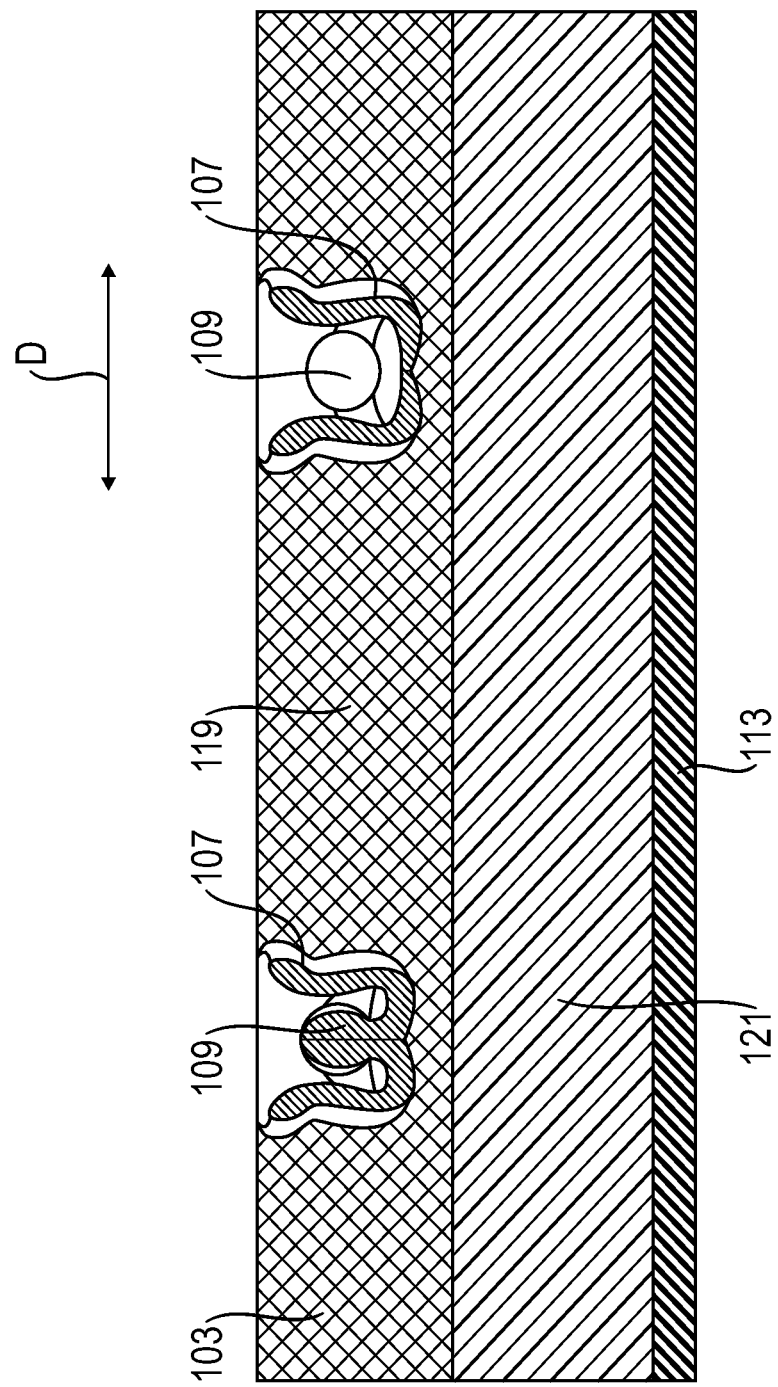
FIG. 2 a representation of two suction cups.

FIG. 2 shows an illustration of two suction cups 107. The suction cups 107-1, . . . , 107-$n$ can be bell-shaped so that the edge of the suction cups 107-1, . . . , 107-$n$ flares outwards. The suction cups 107-1, . . . , 107-$n$ are pot-shaped and have a central, spherical, or conical protrusion 109 in the center, which is located inside the suction cups 107-1, . . . , 107-*n*. The protrusion 109 provides an increased adhesive force in humid conditions, as this protrusion provides for the maintenance of a liquid film inside the suction cups 107-1, . . . , 107-*n*. The protrusion 109 thus generates an increased cohesive force due to the liquid molecules.

The suction cups 107-1, . . . , 107-*n* can be produced in the adhering region 103 in various ways. For example, the suction cups 107-1, . . . , 107-*n* are placed in a thin foil (~50 μm) 119, which is attached to the housing 115 by an adhesive layer 113 on one side and has the suction cups 107-1, . . . , 107-*n* on the other side. This foil can then be individually bonded to the dental object 100 so that the dental object 100 can be attached to the tooth 105 with the suction cup foil.

One or more positively or negatively configured connecting elements may be provided on the adhesion region 103 to create a form-fit geometry with a dental object 100. In this way, a dental object 100 or housing 115 can be attached to the adhering region 103. In this case, the dental object 100 or the housing 115 have positively or negatively configured connecting elements which, together with the connecting element of the adhering region 103, produce the form fit. One or more latching elements can be provided, to which the sensor or the housing 115 is attached to the adhering region 103.

Additionally, the adhering region 103 between the foil 119 and the housing 115 may include a plastic layer 121 that deforms when the dental object 100 is pressed against the tooth 105. The plastic layer 121 is formed, for example, from an elastically deformable foam or rubber or a plastically deformable material, such as plasticine. This is bonded to the housing 115 of the dental object 100 by means of the adhesive layer 113.

When attaching suction cups 107-1, . . . , 107-*n*, a moist environment (saliva) is advantageous, as the seal is increased by the moisture. The pull-off force measurements show that the array 101 of suction cups 107-1, . . . , 107-*n* adheres better to the tooth 105 than adhesive cream.

The method of attaching the dental object 100 comprises the step of pressing the adhering region 103 of the dental object 100 onto a tooth 105 comprising a matrix-shaped array 101 of elastic suction cups 107-1, . . . , 107-*n*. By pressing on, the suction cups 107-1, . . . , 107-*n* adhere to the tooth 105 and hold the dental object 100 in position.

Figure 3:
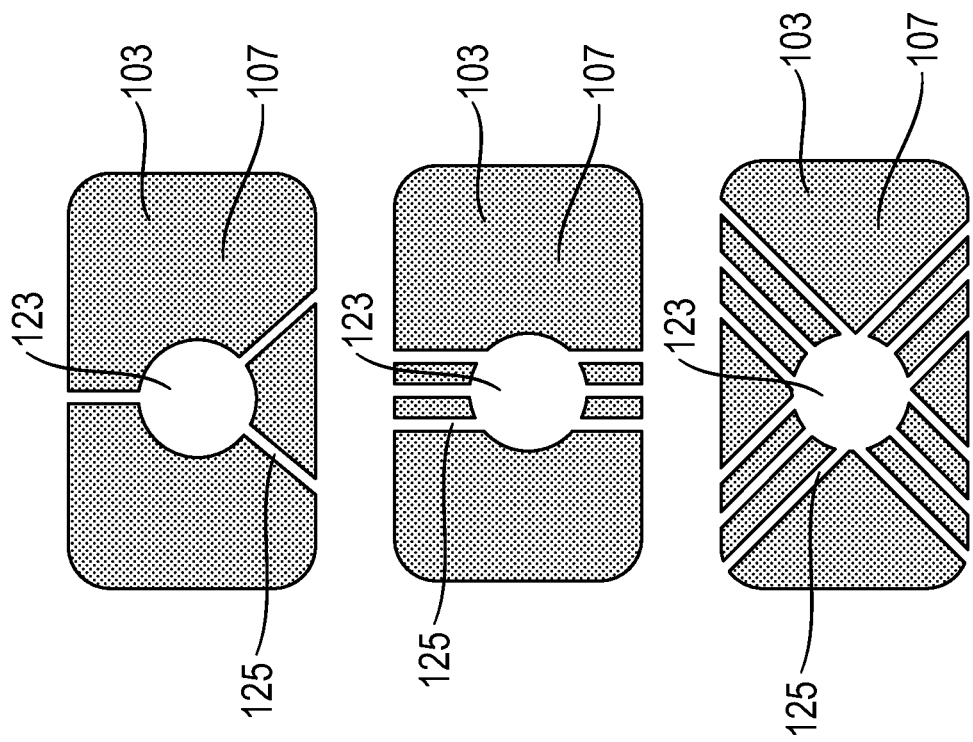
FIG. 3 a schematic representation of the adhering region with channels for a liquid flow.

FIG. 3 shows a schematic diagram of the adhering region 103 with channels 125 for a fluid flow. In the adhering region 103, the dental object 100 and/or the housing 115, the through opening 123 for enabling a measurement by sensor unit is arranged. The through opening 123 forms a measuring area for the sensor unit.

The channels 125 are formed in the adhering region 103, the dental object 100 and/or the housing 115 by recesses and serve to supply liquid (saliva) to the sensor unit and to enable ventilation of the measuring area. The channels 125 may be arranged in a horizontal, diagonal, or vertical direction.

Figure 4:
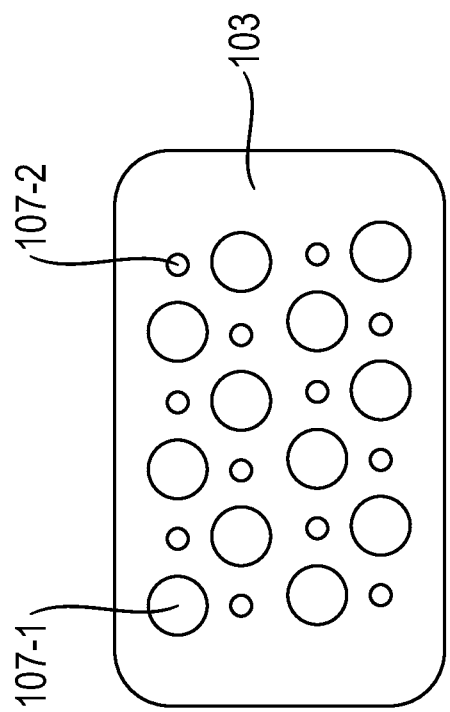
FIG. 4 a schematic representation of an adhering region with suction cups of different diameters.

FIG. 4 shows a schematic representation of an adhering region 103 with suction cups 107 of different diameters. The adhering region 103 includes suction cups 107-1 and 107-2, each having a different outer diameter. The diameter of the suction cups 107-1 is larger than the diameter of the suction cups 107-2, thereby improving the adhesive effect on the tooth so that the adhering region 103 can be adapted for different surfaces. If the suction cups 107-1 also do not hold a surface sufficiently, the adhesive effect can be achieved via the smaller suction cups 107-2 and vice versa.

In general, however, the suction cups 107 may have other diameters or even be randomly distributed within the diameter. In this case, the suction cups 107 have random diameters within a certain range.

FIGS. 5A-5D show cross-sections through different designs of suction cups 107. In FIG. 5A, the suction cup 107 is cylindrical in shape. In the center, this has a spherical protrusion 109, which is located inside the cylindrical recess of the suction cup 107. In FIG. 5B, the suction cup 107 is spherical in shape. The suction cup 107 has a spherical recess. In FIG. 5C, the suction cup 107 is also cylindrical in shape without having a protrusion 109. In FIG. 5D, the suction cup 107 is also cylindrical. In the center, this has an inverted conical protrusion 109, which is located inside the cylindrical recess of the suction cup 107 and whose larger base surface 127 faces outward.

The array 101 of suction cups 107-1, . . . , 107-*n* is used intra-orally for removable attachment of the dental object 100. The use of numerous micro suction cups enables flexible attachment.

All features explained and shown in connection with individual embodiments of the invention may be provided in different combinations in the subject matter of the invention to simultaneously realize their beneficial effects.

All method steps can be implemented by devices which are suitable for executing the respective method step. All functions that are executed by the features in question can be a method step of a method.

The scope of protection of the present invention is given by the claims and is not limited by the features explained in the description or shown in the figures.

REFERENCE LIST

100 Dental object
101 Array
103 Adhesive region
105 Tooth
107 Suction cups
109 Protrusion
111 Contact surface
113 Adhesive layer
115 Housing
117 Recess
119 Foil
121 Plastic layer
123 Through opening
125 Channel
127 Base surface

The invention claimed is:

1. A dental object (100), comprising:
an adhering region (103) for attaching the dental object (100) to a tooth, teeth (105) or a gum, comprising an array (101) of suction cups (107-1, . . . , 107-*n*),
wherein the suction cups (107-1, . . . , 107-*n*) comprise a solid spherical central protrusion (109) having a first diameter, and wherein the solid spherical central protrusion (109) is connected within the suction cup by a portion having a second diameter less than the first diameter.

2. The dental object (100) according to claim 1, wherein the suction cups (107-1, . . . , 107-*n*) have an outer diameter of 10 nm to 5 mm.

3. The dental object (100) according to claim 1, wherein the suction cups (107-1, . . . , 107-*n*) are made of polyurethane acrylate-based polymer or polyethylene acrylate-based polymer.

4. The dental object (100) according to claim 1,
wherein the suction cups (107-1, . . . , 107-*n*) are bell-shaped, spherical, or cylindrical.

5. The dental object (100) according to claim 1,
wherein the dental object (100) has a contact surface (111) with a concave recess for insertion of a tooth (105), at which the adhering region (103) is arranged.

6. The dental object (100) according to claim 1,
wherein the array (101) comprises first suction cups (107-1, . . . , 107-*n*) having a first diameter and second suction cups having a second diameter.

7. The dental object (100) according to claim 1,
wherein the suction cups (107-1, . . . , 107-*n*) are formed by cylindrical recesses in the adhering region (103).

8. The dental object (100) according to claim 1,
wherein the adhering region (103) has a thickness of 10 μm to 5 mm.

9. The dental object (100) according to claim 1,
wherein the suction cups (107-1, . . . , 107-*n*) are arranged in a hexagonal arrangement (101).

10. The dental object (100) according to claim 1,
wherein the adhering region (103) is attached to a contact surface (111) by an adhesive layer (113) and/or the adhering region (103) comprises a connector for producing a form-fit geometry with a sensor and/or a sensor housing and/or the adhering region (103) comprises a latching element for latching onto a sensor and/or sensor housing.

11. The dental object (100) according to claim 1,
wherein the dental object (100) comprises an electronic sensor unit and/or a sensor housing.

12. The dental object (100) according to claim 11,
wherein the adhering region (103), the dental object (100) and/or the housing (115) comprises one or more channels (125) for conducting saliva to the sensor unit.

13. A method of adhering a dental object (100), comprising pressing an adhering region (103) of the dental object (100) comprising an array (101) of suction cups (107-1, . . . , 107-*n*) onto a tooth (105), teeth or gums,
wherein the suction cups (107-1, . . . , 107-*n*) comprise a solid spherical central protrusion (109) having a first diameter, and
wherein the solid spherical central protrusion (109) is connected within the suction cup by a portion having a second diameter less than the first diameter.

14. The method according to claim 13, wherein the suction cups (107-1, . . . , 107-*n*) are bell-shaped, spherical, or cylindrical.

* * * * *